Dec. 6, 1938.    L. F. NORDLING    2,139,093
CONDUIT CASING CUTTING TOOL
Filed Oct. 29, 1937
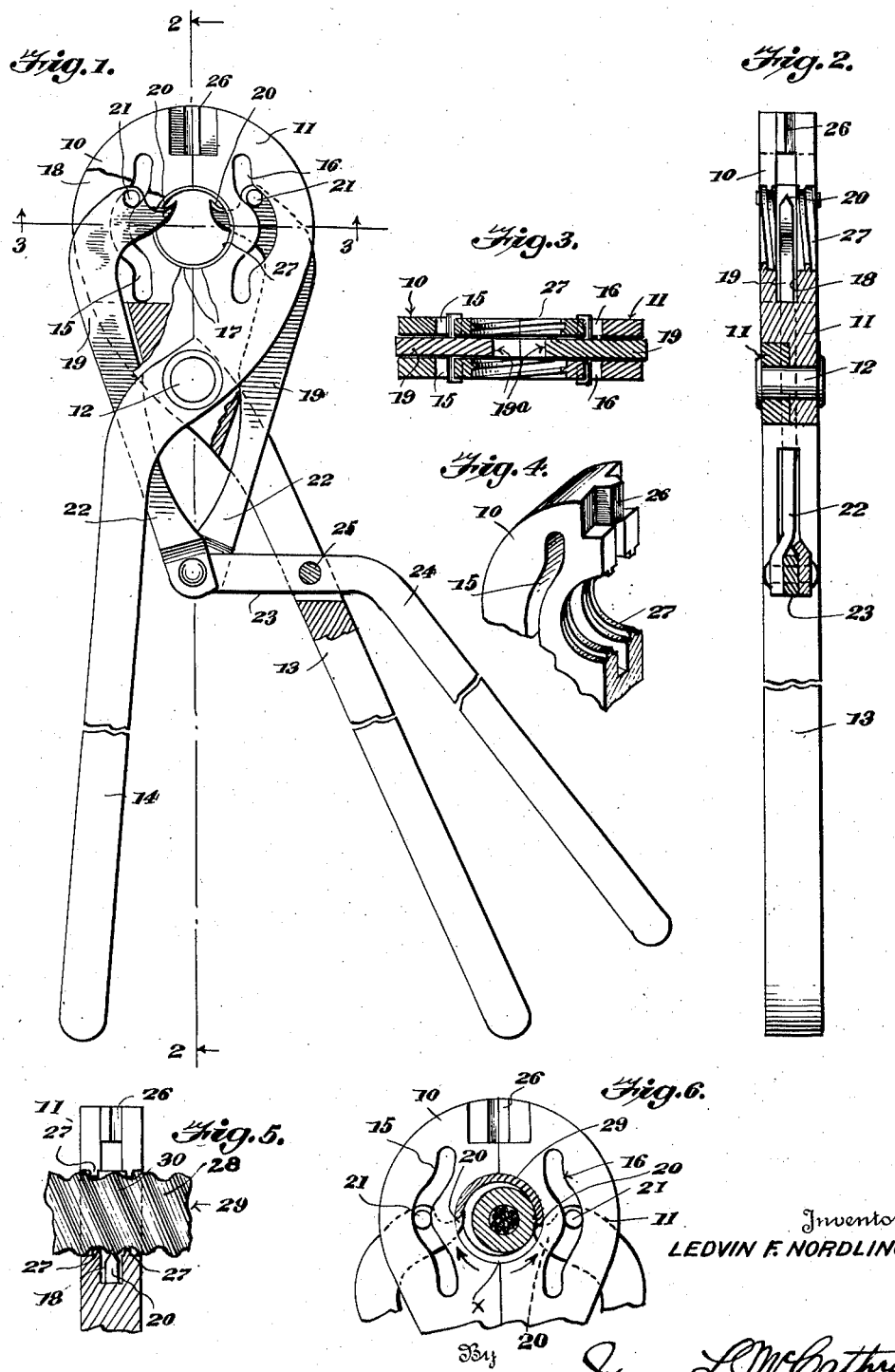
Inventor
LEDVIN F. NORDLING Patented Dec. 6, 1938

2,139,093

UNITED STATES PATENT OFFICE 2,139,093

CONDUIT CASING CUTTING TOOL

Ledvin F. Nordling, Oslo, Minn.

Application October 29, 1937, Serial No. 171,781

3 Claims. (Cl. 30—96)

This invention relates to armor cutting tools and has for one of its objects the production of a simple and efficient tool which is specially designed for cutting the armor casing, and the like, of what is commercially known as "B. X." electric wire tubing or conduits, without cutting the insulation which covers the conducting wires.

A further object of this invention is the production of a simple and efficient means for properly aligning the cutting knives over the bead of the conduit prior to cutting.

Other objects and advantages of the invention will appear throughout the following specification and claims.

In the drawing:—

Figure 1 is a side elevation of the conduit casing cutting tool;

Figure 2 is a vertical sectional view taken on line 2—2 of Figure 1;

Figure 3 is a horizontal sectional view taken on line 3—3 of Figure 1;

Figure 4 is a fragmentary sectional perspective view of a portion of one of the jaws;

Figure 5 is a vertical sectional view through one of the jaws, showing the guiding threads formed upon the inner face of the jaw; and showing the end of one of the cutting blades in its lowermost position where the blades initially punch into the bead of the cable casing;

Figure 6 is a side elevation of the conduit gripping jaws, showing the cutting knives cutting the conduit casing.

By referring to the drawing, it will be seen that 10 designates the primary jaw, to which is pivotally secured the auxiliary jaw 11, as at 12. The jaw 10 is provided with a handle 13 and the jaw 11 is provided with a handle 14. The jaw 10 is provided with aligned cam slots 15 and the jaw 11 is provided with aligned cam slots 16. Each jaw is provided with a semi-circular conduit-receiving socket 17, as shown in Figure 1, which sockets 17 when in registration constitute a circular conduit-receiving aperture. Each jaw is also cut away to provide a knife-receiving cavity 18 extending at right angles to the plane of the slots 15 and 16 and bisecting the same, as shown. The cavity of each jaw extends inwardly from the outer side edge thereof to the sockets formed on the inner faces of the jaws, whereas the slots 15 and 16 of the jaws 10 and 11 are formed in the front and rear faces of the jaws. The cam slots 15 and 16 are so arranged as to extend away from the sockets 17 at a point intermediate the ends of the slots 15 and 16, and to extend toward the sockets 17 at a point near the ends of the slots 15 and 16. These slots 15 and 16 follow the contour of the semi-circular conduit sockets 17 of the jaws 10 and 11.

Knives 19 are fitted within the cavities 18 of the jaws 10 and 11, and are provided with inwardly extending pointed hook-like cutting blades 20 at their ends which register with the sockets 17 of the jaws 10 and 11. Laterally extending pins 21 are carried by the knives 19 near their cutting ends and fit within the cam slots 15 and 16 of the respective jaws 10 and 11. Each knife 19 is provided with a depending shank 22 and these shanks 22 are pivotally connected at their lower ends to an angularly extending end 23 of the knife operating lever 24, the lever 24 being pivoted, as at 25, to the handle 13.

The jaws 10 and 11 are provided with a wire snipping or cutting means 26 at the outer ends of the jaws as shown. Spiral threads 27 are formed upon the inner face of the socket 17 for fitting in the spiral channel 28 of the conduit casing 29, so as to properly position the cutting blades 20 into cutting engagement with the spiral bead 30 of the conduit casing 29 as the tool is placed in a cutting position, such as is shown in Figure 5. In this way, the conduit casing 29 may be easily cut without danger of cutting the insulation of the conduit. The spiral threads 27 by registering with the spiral channels 28 of the "B. X." cable will place the cutting portions 20 of the knives 19 in proper position to punch into the bead portion 30 of the casing 29 in a manner as shown in Figure 5. The pins 21 move longitudinally of the slots 15 and 16 as the lever 24 is swung, and the hook-like cutting blades 20 will cut the cable casing square off, the blades 20 cutting the cable casing from the inside outwardly as shown in Figure 6.

The top face of the blades 20 are an inverted V-shape in cross section and taper toward their outer ends to provide punching points, as shown in Figures 1, 6 and 5. The under face of the blades 19 are flat or dull, as indicated at 19a, to prevent the under face of the blades from injuring the insulation of the insulated wire carried within the cable casing 29, as the knives 19 are moved by the operating lever 24. By having the pointed hook-like punching points of the blades 20 punch into the bead portion 30 of the cable 29, where the cable is spaced slightly from the insulated wire, the knives will move under and easily cut into the cable casing 29, from the inside outwardly in the manner as shown in Figure 6, moving in the direction of the arrows. The tool is held in a set position on the cable casing 29 and by swinging the lever 24, the knives 19 will be moved to cause the blades 20 to completely sever the cable casing 29. The punching points of the blades 20 will enter the cable casing at the point marked X in Figure 6. It should be understood that the hook-like cutting blades 20 penetrate the conduit casing sufficiently to sever completely the valley as well as the bead of the armor or casing. It should be noted also that since the cut is made in a plane perpendicular to the axis of the cable, the blades cut both the valley and bead as they progress in their cutting stroke passing in opposite directions and circumferentially of the armor or casing.

The blades 20 may be provided with any suitable cutting edges without departing from the spirit of the invention.

Certain detail changes in the mechanical construction of the device may be employed without departing from the spirit of the invention so long as such changes fall within the scope of the appended claims.

Having described the invention, what is claimed as new is:—

1. A conduit casing cutting tool comprising a pair of pivotally secured jaws, said jaws having recesses extending transversely therethrough from the outer side edges toward the center, the jaws having sockets formed in their inner edges to provide a conduit-receiving aperture when the jaws are in a closed position, cutting knives mounted within said recesses and having tapering hook-like cutting blades adapted to be moved circumferentially of said aperture for cutting engagement with the casing of a conduit, each jaw having cam guiding slots extending at right angles to said recesses and overlying the recesses, said cutting knives having journal pins slidably mounted in said cam slots, an operating lever pivotally secured to one jaw and pivotally engaging said cutting knives for shifting said pins within said cam slots and causing said knives to move over the surface of a conduit casing for cutting the casing, the knives having upper cutting faces for cutting a cable casing from the inside outwardly as the knives move circumferentially of the casing, thereby cutting off the casing squarely across without injury to the insulated cable carried within the casing.

2. A conduit casing cutting tool comprising a pair of jaws adapted to surround a conduit casing, cutting knives carried by the jaws and adapted to engage a conduit casing, means for moving the knives, means carried by the jaws and knives for guiding the knives in opposed direction along a circumferential path around a conduit casing and perpendicular to the axis of the conduit casing, and said last mentioned means also constituting means for limiting the depth of the cutting action.

3. A conduit casing cutting tool comprising a pair of conduit encircling jaws, cutting knives, knife-moving means carried by the jaws for moving said knives in opposite directions, guiding means carried by said jaws, and means carried by the knives and engaging the guiding means for guiding said knives into cutting engagement transversely of a conduit casing engaged by said jaws and circumferentially thereof and at right angles to the axis of the conduit casing as said knife-moving means is operated.

LEDVIN F. NORDLING.